(12) United States Patent
Gauba et al.

(10) Patent No.: US 8,868,093 B1
(45) Date of Patent: Oct. 21, 2014

(54) CARRIER FREQUENCY ASSIGNMENT BASED ON TRANSMIT POWER DIFFERENTIALS

(75) Inventors: Maneesh Gauba, Overland Park, KS (US); Anoop Kumar Goyal, Overland Park, KS (US); Sachin R. Vargantwar, Macon, GA (US); Maulik K. Shah, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 276 days.

(21) Appl. No.: 13/489,013

(22) Filed: Jun. 5, 2012

(51) Int. Cl.
*H04W 72/00* (2009.01)

(52) U.S. Cl.
USPC ........ 455/452.1; 455/448; 455/450; 455/572; 455/67.11; 455/522

(58) Field of Classification Search
USPC ............. 455/450–453, 522, 67.11–67.16, 69, 455/423–425, 572–574, 448
See application file for complete search history.

(56) References Cited

U.S. PATENT DOCUMENTS

| | | | |
|---|---|---|---|
| 5,697,055 A | 12/1997 | Gilhousen et al. | |
| 5,940,762 A | 8/1999 | Lee et al. | |
| 6,049,535 A * | 4/2000 | Ozukturk et al. | 370/335 |
| 6,069,871 A | 5/2000 | Sharma et al. | |
| 6,212,174 B1 * | 4/2001 | Lomp et al. | 370/335 |
| 6,990,320 B2 * | 1/2006 | LeCren | 455/67.11 |
| 7,212,821 B2 * | 5/2007 | Laroia et al. | 455/437 |
| 7,363,039 B2 * | 4/2008 | Laroia et al. | 455/448 |
| 7,818,023 B2 * | 10/2010 | Li et al. | 455/522 |
| 7,826,863 B2 * | 11/2010 | Wu et al. | 455/522 |
| 8,175,594 B2 * | 5/2012 | Attar et al. | 455/432.1 |
| 8,259,777 B2 * | 9/2012 | Li et al. | 375/142 |
| 8,385,832 B2 * | 2/2013 | Johansson et al. | 455/63.1 |
| 2001/0012775 A1 * | 8/2001 | Modzelesky et al. | 455/427 |
| 2004/0229581 A1 * | 11/2004 | Mizoguchi et al. | 455/136 |
| 2006/0105768 A1 | 5/2006 | Lin et al. | |
| 2010/0105336 A1 * | 4/2010 | Attar et al. | 455/67.11 |
| 2012/0282942 A1 * | 11/2012 | Uusitalo et al. | 455/452.2 |

* cited by examiner

*Primary Examiner* — Sharad Rampuria (57) ABSTRACT

Embodiments disclosed herein provide systems and methods for carrier frequency assignment based on transmit power differentials. In a particular embodiment, a method comprises determining first power levels of first carrier frequencies transmitted from a first wireless network base station and determining second power levels of second carrier frequencies transmitted from a second wireless network base station. The method further comprises determining transmit power differentials between the first power levels and the second power levels for corresponding ones of the first and second carrier frequencies. The method further comprises assigning a wireless communication device to one of the first carrier frequencies based on the transmit power differentials.

18 Claims, 6 Drawing Sheets

| TRANSMIT POWER (dBm) TABLE 500 | | | | | |
|---|---|---|---|---|---|
| BS | Carrier 1 | Carrier 2 | Carrier 3 | Carrier 4 | Carrier 5 |
| 306 | 40 | 32 | 45 | NA | 36 |
| 307 | NA | 26 | 34 | 42 | 40 |
| Differential | NA | 6 | 11 | NA | -4 |

CARRIER FREQUENCY ASSIGNMENT BASED ON TRANSMIT POWER DIFFERENTIALS

TECHNICAL BACKGROUND

When a wireless communication device moves to a new area, the device may switch from communications with one base station to communications with another base station that serves the new an area. When the wireless device is participating in an active call session, whether voice, data, or otherwise, the wireless device will optimally perform a soft handoff when moving from one base station to another. During a soft handoff the wireless device begins exchanging communications with the new base station before severing communications with the previous base station.

While a soft handoff is the preferred way to switch a wireless device from one base station to another, a soft handoff is not always possible. In some situations network conditions exist that prevent a wireless device from performing a soft handoff. For example, a carrier frequency used by a wireless device to communicate on one base station may be under a high communication load on the base station to which the wireless device is moving. The high communication load may prevent the wireless device from performing a soft handoff to the same carrier frequency on the other base station.

Overview

Embodiments disclosed herein provide systems and methods for carrier frequency assignment based on transmit power differentials. In a particular embodiment, a method comprises determining first power levels of first carrier frequencies transmitted from a first wireless network base station and determining second power levels of second carrier frequencies transmitted from a second wireless network base station. The method further comprises determining transmit power differentials between the first power levels and the second power levels for corresponding ones of the first and second carrier frequencies. The method further comprises assigning a wireless communication device to one of the first carrier frequencies based on the transmit power differentials.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
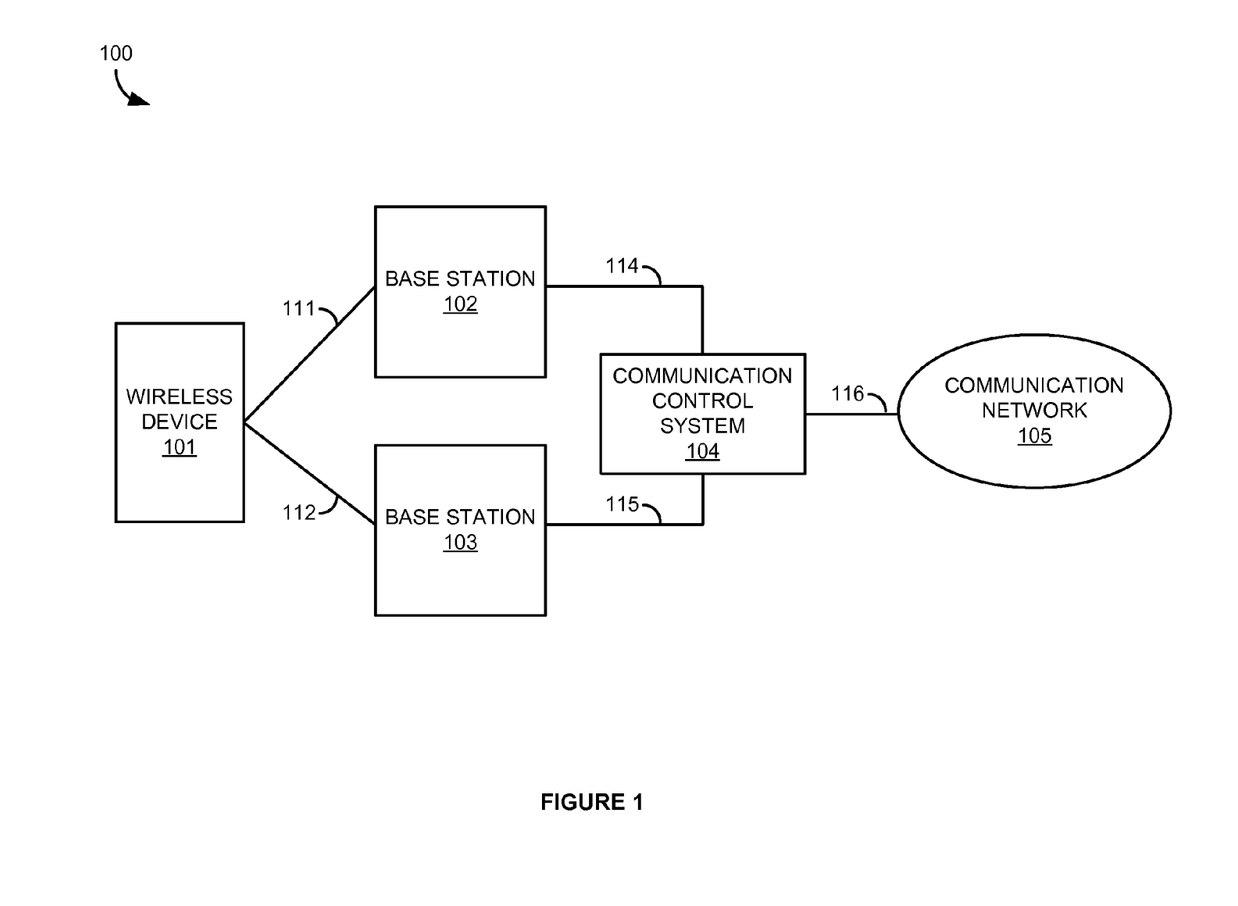
FIG. 1 illustrates a wireless communication system for carrier frequency assignment based on transmit power differentials.

FIG. 1 illustrates wireless communication system 100. Wireless communication system 100 includes wireless communication device 101, base station 102, base station 103, communication control system 104, and communication network 105. Wireless communication device 101 and base station 102 communicate over wireless link 111. Wireless communication device 101 and base station 103 communicate over wireless link 112. Base station 102 and communication control system 104 communicate over communication link 114. Base station 103 and communication control system 104 communicate over communication link 115. Communication control system 104 and communication network 105 communicate over communication link 116.

In operation, base stations 102 and 103 exchange communications with wireless device 101 to provide wireless device 101 with communication access to communication network 105. At least one of the carrier frequencies used by both base station 102 and 103 are the same so that wireless device 101 can perform a soft handoff from base station 102 to base station 103 and vice versa. The handoff may be caused by wireless device 101 moving from a wireless sector served by base station 102 into a wireless sector served by base station 103, by a signal transmitting by base station 103 becoming stronger than a signal transmitted by base station 102 for some other reason, or by any reason that a wireless device may handoff from one base station to another.

Figure 2:
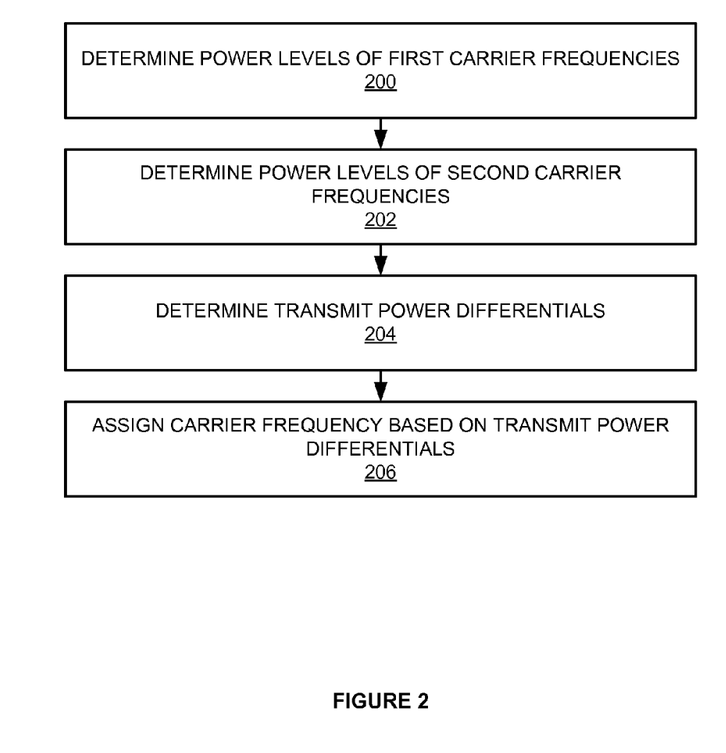
FIG. 2 illustrates the operation of the wireless communication system for carrier frequency assignment based on transmit power differentials.

FIG. 2 illustrates the operation of wireless communication system 100 for carrier frequency assignment based on transmit power differentials. Communication control system 104 performs the described functionality. However, the functionality of communication control system 104 may be integrated into base stations 102 and 103 or communication network 105, as well as be distributed among those elements.

The operation begins by determining first power levels of first carrier frequencies transmitted from base station 102 (step 200). The first power levels may be power levels of the pilot signal or for some other channel(s) for each of the second carrier frequencies. The first power levels may be determined based on a set power output of base station 102 for each of the first carrier frequencies, based on a measured output of a wireless transmitter for each of the first carrier frequencies, or any other way of determining transmit power levels for wireless signals.

For example, base station 102 may be instructed via communication control system 104, or another control system, to transmit carrier frequencies at given power levels. The first power levels may therefore be determined as being the instructed power levels. Alternatively, the base station 302 may include equipment that can measure the first power levels as the first carrier frequencies are transmitted.

The operation further includes determining second power levels of second carrier frequencies transmitted from base station 103 (step 202). The second power levels may be power levels of the pilot signal or for some other channel(s) for each of the second carrier frequencies. The second power levels may be determined based on a set power output of base station 103 for each of the second carrier frequencies, based on a measured output of a wireless transmitter for each of the second carrier frequencies, or any other way of determining transmit power levels for wireless signals.

Once the power levels have been determined, the operation continues by determining transmit power differentials between the first power levels and the second power levels for corresponding ones of the first and second carrier frequencies (step 204). Each transmit power differential is the difference in the transmit power level of a carrier frequency of the first carrier frequencies compared to the transmit power level of a corresponding carrier frequency of the second carrier frequencies. Corresponding carrier frequencies are carrier frequencies of the first carrier frequencies that are also carrier frequencies of the second carrier frequencies. For example, if the first carrier frequencies include carrier frequencies 1-3 and the second carrier frequencies include carrier frequencies 2-4, then carrier frequencies 2 and 3 are corresponding carrier frequencies because they are included in both the first and second carrier frequencies. Thus, the transmit power differentials would comprise transmit power differentials between carrier frequencies 2 and 3.

After determining the transmit power differentials, the operation provides assigning wireless communication device 101 to one of the first carrier frequencies based on the transmit power differentials (step 208). The carrier frequency that is assigned may be the carrier frequency corresponding to the greatest transmit power differential. In the example from above, if carrier frequency 2 has a greater transmit power differential than carrier frequency 3, then wireless device 101 is assigned to carrier frequency 2. In alternate examples, the carrier frequency is selected from carrier frequencies with transmit power differentials meeting a threshold, or selected using any other transmit threshold criteria.

Advantageously, assigning wireless device 101 to a carrier frequency having a higher transmit power differential increases the likelihood that the corresponding carrier frequency in the second carrier frequencies is capable of accepting wireless device 101 in a soft handoff. The likelihood is increased because a lower transmit power level for a carrier frequency typically corresponds to less wireless devices using the carrier frequency. Less wireless devices means less noise being produced on the carrier frequency so a base station is not required to increase power in order to overcome the noise. Therefore, assigning wireless device 101 to a carrier frequency with higher transmit power differential increases the likelihood that wireless device 101 will be able to perform a soft handoff from base station 102 to base station 103.

Additionally, in accordance with a higher transmit power corresponding to a higher communication load, a higher transmit power differential may mean that the carrier frequency of the first carrier frequencies is under high load. Therefore, if wireless device 101 is assigned to that carrier frequency before handing off, the departure of wireless device 101 to base station 103 will lessen the communication load for the carrier frequency on base station 102.

In some embodiments, the communication load on each of the first carrier frequencies is considered when selecting the carrier frequency to assign to wireless device 101. Thus, even if one carrier frequency would be selected based on its transmit power differential, a different carrier frequency of the first carrier frequencies may be selected if that one carrier frequency has a high communication load and would be unable to accommodate wireless device 101 at a level of service required by wireless device 101.

In further embodiments, some or all of the steps in FIG. 2 may only be performed if wireless device 101 is located near a border where the wireless coverage areas of base stations 102 and 103 meet. If wireless device 101 is located at the border, then it is more likely that wireless device 101 will need to handoff to base station 102. Thus, the location of wireless device 101 is ascertained by receiving geographic coordinates of wireless device 101, by performing base station triangulation, or by any other method for determining a location of a wireless device. Upon determining that wireless device 101 is located near a border, wireless device 101 is assigned a carrier frequency based on transmit power differentials in anticipation that wireless device 101 will need to perform a soft handoff. Some embodiments may periodically or continually update the transmit power differentials so that only a carrier frequency need be assigned when wireless device 101 is located near a border. Alternative embodiments will determine the transmit power differentials at the time wireless device 101 is determined to be located near the border.

In yet further embodiments, the method described above may further determine transmit power differentials between the first carrier frequencies and corresponding carrier frequencies from other base stations that border base station 102. Therefore, the location of wireless device 101 is processed to determine to which bordering base station wireless device 101 is most likely to handoff and then assign a carrier frequency based on transmit power differentials between base station 102 and that bordering base station.

Referring back to FIG. 1, wireless communication device 101 comprises Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. Wireless communication device 101 may be a telephone, computer, e-book, mobile Internet appliance, wireless network interface card, media player, game console, or some other wireless communication apparatus—including combinations thereof.

Base stations 102 and 103 each comprise RF communication circuitry and an antenna. The RF communication circuitry typically includes an amplifier, filter, RF modulator, and signal processing circuitry. Base stations 102 and 103 may also comprise a router, server, memory device, software, processing circuitry, cabling, power supply, network communication interface, structural support, or some other communication apparatus.

Communication control system 104 comprises a computer system and communication interface. Communication control system 104 may also include other components such a router, server, data storage system, and power supply. Communication control system 104 may reside in a single device or may be distributed across multiple devices. Communication control system 104 is shown externally to wireless base stations 102 and 103, but system 104 could be integrated within the components of wireless base stations 102 and/or 103. Communication control system 104 could be a base station controller, mobile switching center, network gateway system, Internet access node, application server, service node, or some other communication system—including combinations thereof.

Communication network 105 comprises network elements that provide communications services to wireless device 101 through wireless base stations 102 and 103. Communication network 105 may comprise switches, wireless access nodes, Internet routers, network gateways, application servers, computer systems, communication links, or some other type of communication equipment—including combinations thereof.

Wireless links 111 and 112 use the air or space as the transport media. Wireless links 111 and 112 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication links 114-116 uses metal, glass, air, space, or some other material as the transport media. Communication links 114-116 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication links 114-116 could be direct links or may include intermediate networks, systems, or devices.

Figure 3:
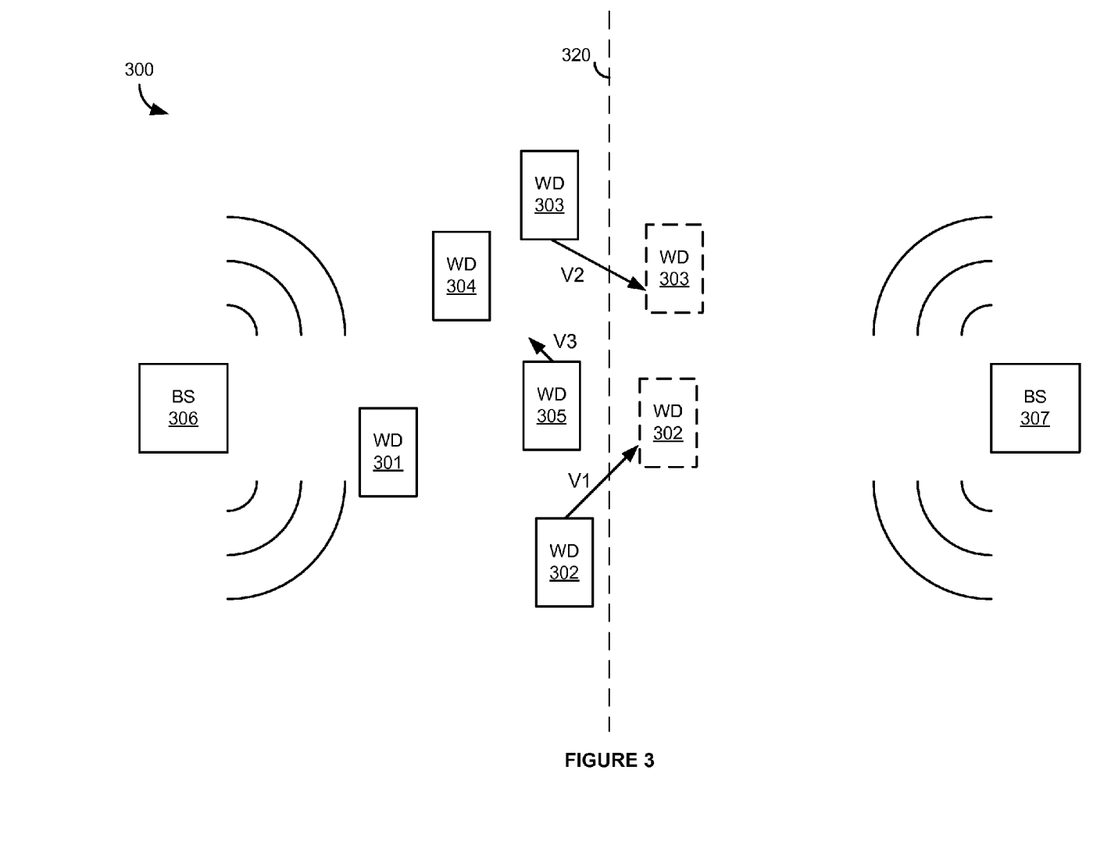
FIG. 3 illustrates a wireless communication system for carrier frequency assignment based on transmit power differentials.

FIG. 3 illustrates wireless communication system 300. Wireless communication system 300 includes wireless devices 301-305, base station 306, and base station 307. Although not shown, base stations 306 and 307 are connected to communication control system 104 and provide access to communication network 105 for wireless devices 301-305.

Figure 4:
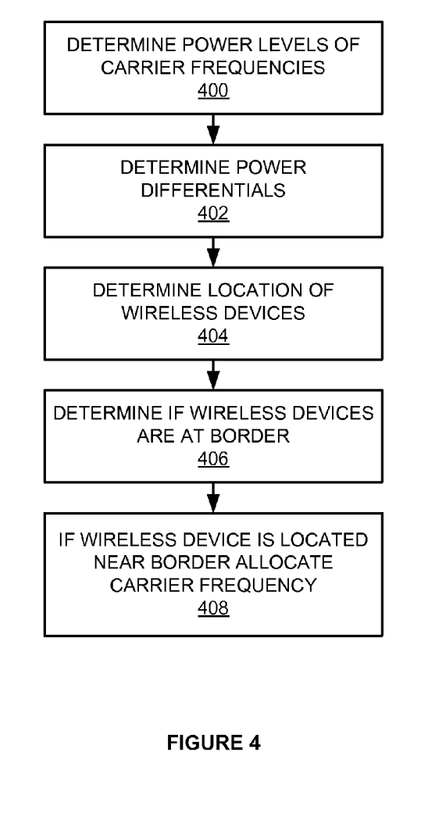
FIG. 4 illustrates the operation of the wireless communication system for carrier frequency assignment based on transmit power differentials.

FIG. 4 illustrates the operation of wireless communication system 300 for carrier frequency assignment based on transmit power differentials. Communication control system 104 determines transmit power levels of the carrier frequencies transmitted from base stations 306 and 307 (step 400). Transmit power levels may be determined for every carrier frequency that is transmitted from base stations 306 and 307 or only for the carrier frequencies that base stations 306 and 307 have in common.

Figure 5:
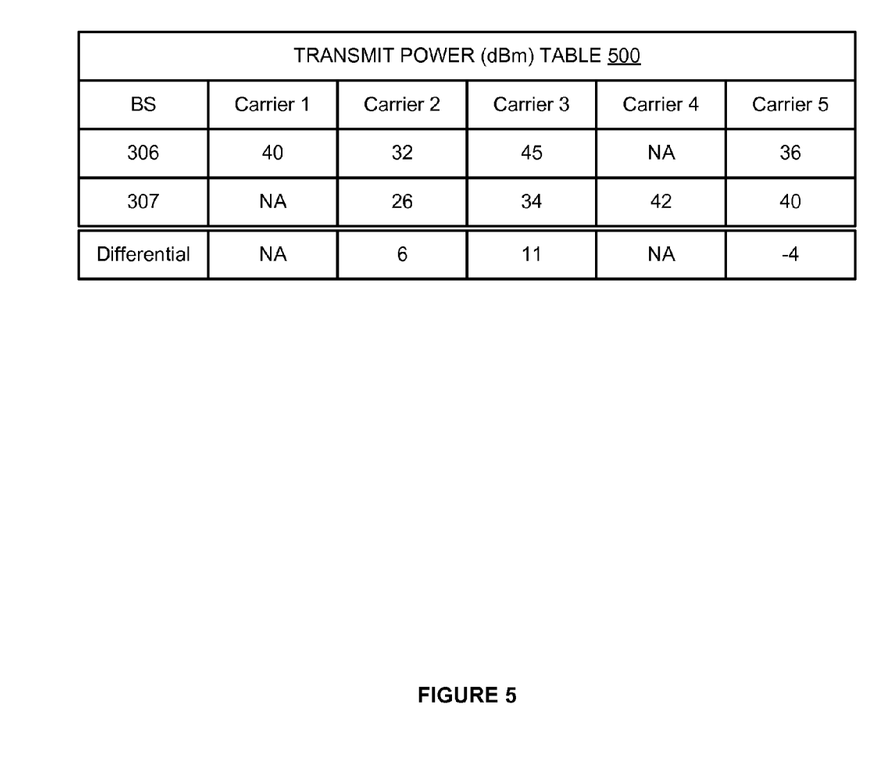
FIG. 5 illustrates a transmit power differential table for carrier frequency assignment based on transmit power differentials.

For example, FIG. 5 illustrates transmit power table 500. Power levels in transmit power table 500 are shown in decibels referenced to one milliwatt (dBm). Transmit power table 500 shows that base station 306 transmits carrier frequencies 1-3 and 5 while base station 307 transmits carrier frequencies 2-5. The measured power levels shown in transmit power table 500 are merely exemplary and can take any power value that a base station may transmit. Thus, in accordance with transmit power table 500, when determining transmit power levels for the carrier frequencies, communication control system 104 may only determine transmit power levels for carrier frequencies 2, 3, and 5, which base stations 306 and 307 have in common.

Alternatively, communication control system 104 may also determine transmit power levels for carrier 1 on base station 307 and carrier 4 on base station 306. Communication control system 104 may need to determine the power levels of these unshared carrier frequencies because the carrier frequencies are shared with other bordering base stations or for any other reason communication control system 104 would determine all power levels.

Once the power levels have been determined, communication control system 104 calculates the difference in power level between each of the common carrier frequencies (step 402). These power level differentials are calculated by simply subtracting the power level of a base station 307 carrier frequency from the power level of the corresponding base station 306 frequency.

In some embodiments, communication control system 104 may repeat steps 400 and 402 periodically so that the transmit power levels and transmit power differentials for carrier frequencies 1-5 in transmit power table 500 remain current.

At some point in time, one or more of wireless devices 301-305 will require a carrier frequency to exchange wireless communications with base station 306. In order to determine which carrier frequency of carriers 1-3 and 5 on base station 306 a wireless device should be assigned, communication control system 104 determines a location of the wireless device that requires a carrier frequency (404). The location may be determined using geographic coordinates received from a GPS enabled wireless device, using base station triangulation, or by any other method of determining a location of a wireless device. In some embodiments, communication control system 104 may periodically update the location of wireless devices 301-305 so that carrier frequency assignment is not delayed due to the location determination.

After the location of the wireless device is determined, communication control system determines whether the wireless device is located at a border (step 406). In FIG. 3, the border between the wireless sector served by base stations 306 and the wireless sector served by base station 307 is represented by a dashed line as border 320. While border 320 is depicted as a straight line, border 320 may take any shape in accordance with the wireless signal propagation characteristics of the carrier frequencies transmitted from base stations 306 and 307. Typically, wireless sectors will overlap in order to allow for handoffs between the wireless sectors. Therefore, border 320 represents the point at which a wireless device will handoff from base station 306 to base station 307.

In the present example, communication control system 104 determines that wireless devices 302-305 are within a threshold distance of border 320. Therefore, communication control system 104 will allocate a carrier frequency for each of wireless devices 302-305 based on the transmit power differentials listed in transmit power table 500 (step 408). Wireless device 301 is not located near border 320 and communication control system 104 does not necessarily allocate a carrier frequency to wireless device 301 based on transmit power differentials.

Using one method of allocation based on transmit power differentials, each of wireless devices 302-305 that requires a carrier frequency is allocated carrier 3 because carrier 3 has the greatest transmit power differential of 11 verses 6 for carrier 2 and −4 for carrier 5.

In an alternative method of allocation, a transmit power differential threshold is compared to the transmit power differentials. The differential threshold may be set by an operator of communication control system 104 in order to obtain a desired allocation result. For example, if the differential threshold is set at 5, then the transmit power differentials for both carrier 2 and carrier 3 satisfy the threshold. Accordingly, communication control system 104 will assign each of wireless devices 302-305 to either carrier 2 or 3.

After determining that carrier 2 and 3 exceed the differential threshold, communication control system 104 may consider other factors when determining which of carrier frequencies 2 and 3 should be allocated. One of these other factors may be the current communication load on carriers 2 and 3 on base station 306. The communication load may be determined as a total number of devices using the carrier frequency, the amount of bandwidth being used on the carrier frequency, or any other measure of communication load. For example, if the communication load on carrier 3 is above a threshold or otherwise indicates to communication control system 104 that carrier 3 is ill-equipped to handle more communications, then communication control system 104 will allocate carrier 2 to the wireless devices.

In some embodiments, communication control system 104 may further determine a velocity of wireless devices 301-305 when determining whether wireless devices are located near border 320 at step 406. As illustrated in FIG. 3, wireless devices 301 and 304 are stationary while the V1, V2, and V3 arrows leading from wireless devices 302, 303, and 305 represent the relative magnitude and direction of the velocities of wireless devices 302, 303, and 305. The velocities of wireless devices 301-305 may be determined by receiving Global Positioning System or other sensor information from wireless devices 301-305, by performing BTS triangulation, or by any other method that can determine the velocity of a wireless device.

After determining the velocities of wireless devices 301-305, communication control system 104 determines whether any of wireless devices 301-305 will cross border 320 and handoff to base stations 307 within a period of time. For example, a time threshold may be set to one minute and communication control system 104 determines whether any of devices 301-305 will cross border 320 and handoff to base station 307 within the one minute period. When a wireless device of wireless devices 301-305 is expected to cross border 320 within the one minute threshold, then communication control system 104 will assign the wireless device to a carrier frequency based on the transmit threshold differentials in accordance with step 408.

Using the example velocities shown in FIG. 3, communication control system determines that, while wireless devices 302-305 are located near border 320, only wireless devices 302 and 303 are estimated to cross border 320 within a threshold time period. In particular, wireless device 304 is stationary and will not imminently cross border 320. Similarly, the velocity, V3, of wireless device 305 has a small magnitude relative to the velocities V1 and V2 of wireless devices 302 and 303, respectively, and is directed away from border 320. Thus, like wireless device 304, communication control system 104 determines that wireless device 305 will not imminently cross border 320.

In contrast, communication control system 104 determines that wireless devices 302 and 303 have velocities, V1 and V2, of sufficient magnitude and direction to estimate that wireless devices 302 and 303 will cross border 320 within time period threshold. Accordingly, when either of wireless devices 302 and 303 requires a carrier frequency, communication control system 104 allocates a carrier frequency to the wireless device based on the transmit power differentials of table 500. If both wireless devices 302 and 303 are assigned to carrier 3 on base station 306, then wireless devices 302 and 303 will perform a soft handoff to carrier 3 on base station 307 when they cross border 320 as illustrated in FIG. 3.

Figure 6:
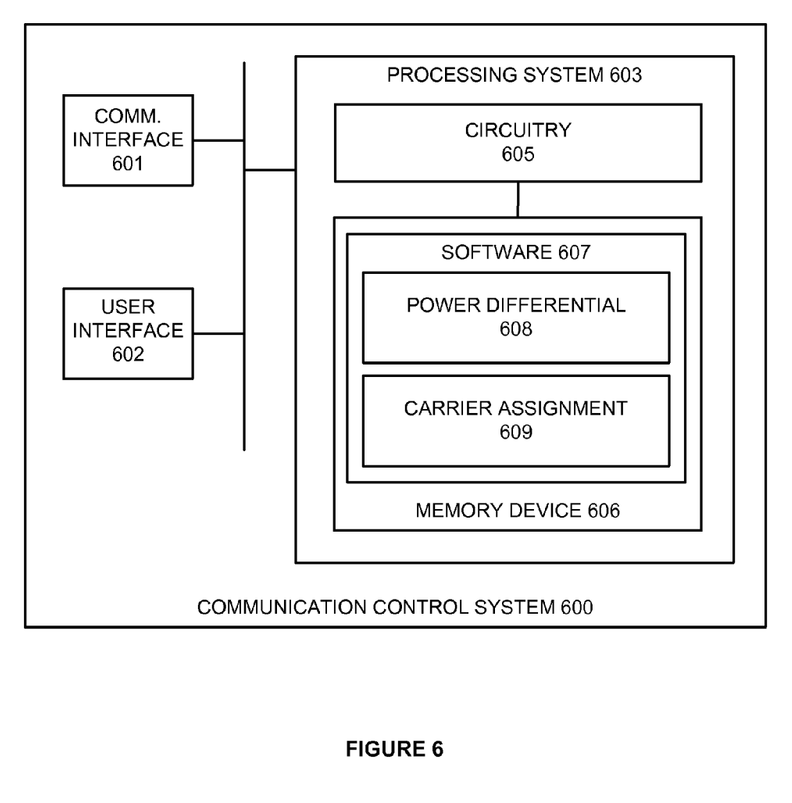
FIG. 6 illustrates a communication control system for carrier frequency assignment based on transmit power differentials.

FIG. 6 illustrates communication control system 600. Communication control system 600 is an example of communication control system 104, although control system 104 may use alternative configurations. Communication control system 600 comprises communication interface 601, user interface 602, and processing system 603. Processing system 603 is linked to communication interface 601 and user interface 602. Processing system 603 includes processing circuitry 605 and memory device 606 that stores operating software 607.

Communication interface 601 comprises components that communicate over communication links, such as network cards, ports, RF transceivers, processing circuitry and software, or some other communication devices. Communication interface 601 may be configured to communicate over metallic, wireless, or optical links. Communication interface 601 may be configured to use TDM, IP, Ethernet, optical networking, wireless protocols, communication signaling, or some other communication format—including combinations thereof.

User interface 602 comprises components that interact with a user. User interface 602 may include a keyboard, display screen, mouse, touch pad, or some other user input/output apparatus. User interface 602 may be omitted in some examples.

Processing circuitry 605 comprises microprocessor and other circuitry that retrieves and executes operating software 607 from memory device 606. Memory device 606 comprises a non-transitory storage medium, such as a disk drive, flash drive, data storage circuitry, or some other memory apparatus. Operating software 607 comprises computer programs, firmware, or some other form of machine-readable processing instructions. Operating software 607 includes power differential module 608 and carrier assignment module 609. Operating software 607 may further include an operating system, utilities, drivers, network interfaces, applications, or some other type of software. When executed by circuitry 605, operating software 607 directs processing system 603 to operate communication control system 600 as described herein.

In particular, power differential module 608 directs processing system 603 to determine first power levels of first carrier frequencies transmitted from a first wireless network base station and determine second power levels of second carrier frequencies transmitted from a second wireless network base station. Power differential module 608 further directs processing system 603 to determine transmit power differentials between the first power levels and the second power levels for corresponding ones of the first and second carrier frequencies. Carrier assignment module 609 directs processing system 603 to assign a wireless communication device to one of the first carrier frequencies based on the transmit power differentials.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system, comprising:
   determining first power levels of first carrier frequencies transmitted from a first wireless network base station;
   determining second power levels of second carrier frequencies transmitted from a second wireless network base station;
   determining transmit power differentials between the first power levels and the second power levels for corresponding ones of the first and second carrier frequencies; and
   assigning a wireless communication device to one of the first carrier frequencies based on the transmit power differentials;
   wherein assigning the wireless communication device to one of the first carrier frequencies based on the transmit power differentials comprises determining at least one transmit power differential of the transmit power differentials that satisfies a threshold power differential threshold and selecting the carrier frequency from carrier frequencies that correspond to the at least one transmit power differential.

2. The method of claim 1, wherein selecting the carrier frequency from carrier frequencies that correspond to the at least one transmit power differential comprises
    determining a greatest transmit power differential of the at least one transmit power differential; and
    selecting the carrier frequency that corresponds to the greatest transmit power differential.

3. The method of claim 1, wherein assigning the wireless communication device to one of the first carrier frequencies is further based on a communication load on each of the first carrier frequencies.

4. The method of claim 3, wherein assigning the wireless communication device to one of the first carrier frequencies comprises:
    ranking the transmit power differentials from highest to lowest;
    determining a communication load on each frequency of the first carrier frequencies; and
    wherein the carrier frequency is selected from carrier frequencies that correspond to the at least one transmit power differential that also satisfies a communication load threshold.

5. The method of claim 1, further comprising:
    performing a soft handoff of the wireless communication device from the carrier frequency to a corresponding carrier frequency of the second carrier frequencies.

6. The method of claim 1, further comprising:
    determining a location of the wireless communication device;
    determining whether the location is at a border of a wireless sector served by the first base station; and
    assigning the carrier frequency if the location is at the border.

7. The method of claim 6, wherein determining whether the location is at the border comprises:
    if the location is more than a threshold distance away from the first base station, determining that the wireless communication device is located at the border.

8. The method of claim 6, wherein determining whether the location is at the border comprises:
    determining a velocity vector of the wireless communication device;
    if the location and velocity vector indicate that the wireless communication device will exit the wireless sector within a threshold length of time, determining that the wireless communication device is located at the border.

9. The method of claim 6, wherein determining the location comprises:
    receiving geographic coordinates from the wireless communication device.

10. A wireless communication system, comprising:
    a first wireless network base station configured to provide wireless communication access to a plurality of wireless communication devices over first carrier frequencies;
    a second wireless network base station configured to provide wireless communication access to the plurality of wireless communication devices over second carrier frequencies;
    a communication control system configured to determine first power levels of the first carrier frequencies transmitted from the first wireless network base station, determine second power levels of the second carrier frequencies transmitted from the second wireless network base station, determine transmit power differentials between the first power levels and the second power levels for corresponding ones of the first and second carrier frequencies, and assign a wireless communication device to one of the first carrier frequencies based on the transmit power differentials;
    wherein the communication control system configured to assign a wireless communication device to one of the first carrier frequencies based on the transmit power differentials comprises the communication control system configured to determine at least one transmit power differential of the transmit power differentials that satisfies a threshold power differential threshold and select the carrier frequency from carrier frequencies that correspond to the at least one transmit power differential.

11. The wireless communication system of claim 10, wherein the communication control system configured to select the carrier frequency from carrier frequencies that correspond to the at least one transmit power differential comprises the communication control system configured to:
    determining a greatest transmit power differential of the at least one transmit power differential; and
    selecting the carrier frequency that corresponds to the greatest transmit power differential.

12. The wireless communication system of claim 10, wherein the communication control system is configured to assign the wireless communication device to one of the first carrier frequencies further based on a communication load on each of the first carrier frequencies.

13. The wireless communication system of claim 12, wherein the communication control system is configured to assign the wireless communication device to one of the first carrier frequencies by:
    ranking the transmit power differentials from highest to lowest;
    determining a communication load on each frequency of the first carrier frequencies; and
    wherein the carrier frequency is selected from carrier frequencies that correspond to the highest power differential that also satisfies a communication load threshold.

14. The wireless communication system of claim 10, further comprising:
    the first wireless network base station and the second wireless network base station configured to perform a soft handoff of the wireless communication device from the carrier frequency to a corresponding carrier frequency of the second carrier frequencies.

15. The wireless communication system of claim 10, further comprising:
    the communication control system configured to determine a location of the wireless communication device, determine whether the location is at a border of a wireless sector served by the first base station, and assign the carrier frequency if the location is at the border.

16. The wireless communication system of claim 15, wherein the communication control system is configured to determine whether the location is at the border by:
    if the location is more than a threshold distance away from the first base station, determining that the wireless communication device is located at the border.

17. The wireless communication system of claim 15, wherein the communication control system is configured to determine whether the location is at the border by:
    determining a velocity vector of the wireless communication device;
    if the location and velocity vector indicate that the wireless communication device will exit the wireless sector within a threshold length of time, determining that the wireless communication device is located at the border.

18. The wireless communication system of claim 15, wherein the communication control system is configured to receive geographic coordinates from the wireless communication device to determine the location.

* * * * *